United States Patent [19]
Bogue

[11] 3,843,962
[45] Oct. 22, 1974

[54] BEARING
[75] Inventor: Irving R. Bogue, Hebron, Conn.
[73] Assignee: Rogers Corporation, Rogers, Conn.
[22] Filed: Aug. 20, 1973
[21] Appl. No.: 390,129

[52] U.S. Cl.................................. 308/187, 308/193
[51] Int. Cl........................ F16c 33/60, F16c 33/00
[58] Field of Search .......... 308/241, 187, 191, 193, 308/201

[56] References Cited
UNITED STATES PATENTS
3,079,024  2/1963  Lamson et al. .................... 308/241

Primary Examiner—Charles J. Myhre
Assistant Examiner—Frank Susko

[57] ABSTRACT

A bearing configuration is presented wherein the races are a hard metal, such as steel, coated with a soft metal, such as silver; the bearing elements are a hard metal insoluble with the race coating material, such as stainless steel; and the retainer is a polymeric material filled with a metallic sulfide, such as $MoS_2$, which bonds to the race coating material.

10 Claims, 1 Drawing Figure

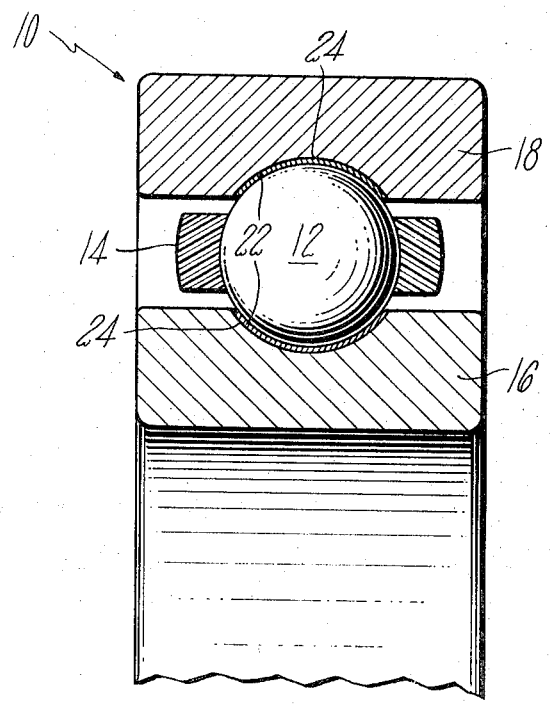

BEARING

BACKGROUND OF THE INVENTION

1. Field of the Invention

This invention relates generally to the reduction of friction on bearing surfaces. More specifically, the present invention is directed to improved bearings and particularly bearings of the type having a dry film lubricant. Accordingly, the general objects of the present invention are to provide novel and improved methods and articles of such character.

2. Description of the Prior Art

While not limited thereto in its utility, the present invention is particularly well suited for use in hostile environments such as, for example, in high temperatures and where liquid lubricants can not be employed. There are, in the prior art, numerous bearing assemblies which employ a solid lubricating material. These prior art bearings typically include the solid lubricating material permanently applied as a film to a surface to be lubricated. The prior art bearings of the dry film lubricant type, while having been moderately successful, have been characterized by comparatively short operational life.

SUMMARY OF THE INVENTION

The present invention overcomes the above briefly discussed and other deficiencies and disadvantages of the prior art by providing a novel and improved anti-friction bearing and a method of fabricating such bearings. A bearing in accordance with the present invention utilizes, as the bearing elements, stainless steel members. These bearing members are positioned relative to one another in a cage or retainer comprised of a polymeric material which includes a metallic sulfide. The bearing elements travel in races comprised of a suitably hard strong metal which has been plated with a soft metal, typically silver, which exhibits substantive affinity to sulphur. While not wishing or intending to be bound by any particular mechanism or theory of operation, by which the invention achieves its desired results, it appears that the soft metal on the races reduces wear during the break-in period of the bearing and, during use, lubrication is believed to be achieved by the removal of the metallic sulfide from the retainers by the bearing elements and the transfer of the thus removed sulfide to the soft metallic coating on the bearing races through a chemisorption process.

BRIEF DESCRIPTION OF THE DRAWING

The present invention may be better understood and its numerous objects and advantages will become apparent to those skilled in the art by reference to the accompanying drawing which is a cross-sectional side elevation view of a ball bearing in accordance with the invention.

DESCRIPTION OF THE PREFERRED EMBODIMENT

The invention will be described with reference to ball bearings; however, it will be understood that it is equally applicable to roller and other bearings.

With reference now to the drawing, a ball bearing assembly designed for operation for substantial periods of time in a hostile environment without any outside lubricant is indicated generally at 10. The bearing assembly 10 includes a plurality of stainless steel balls 12 which are retained in position relative to one another by means of a cage or retainer 14. The retainer is comprised of a polymeric material which includes, as a filler, a metallic sulfide. Thus, retainer 14 may be comprised of a fiber reinforced plastic molded from the composition which includes the metallic sulfide such as molybdenum disulfide ($MoS_2$); molybdenum disulfide being known in the art as having desirable lubricating properties.

The reinforced plastic material from which the retainer 14 was fabricated, in one reduction to practice of the invention, was a microfiberglass reinforced polytetrafluoroethylene. The manufacture of such a reinforced polytetrafluoroethylene is disclosed in copending U.S. application Ser. No. 308,749 assigned to the assignee of the present invention and to which reference is hereby made for incorporation herein for a disclosure of such material and the method of manufacture thereof. In preparing the molding compound from which the retainers are fabricated, microfiberglass or other fiber reinforcing material will be included in an amount of from approximately 3 to 25 percent by weight and, when molybdenum disulfide is the solid lubricant, the lubricating material will be included in an amount of from approximately 2 to 50 percent by weight. In one successful test of a preferred embodiment of the invention both molybdenum disulfide and microfiberglass were included in the polymeric molding compound in amounts of approximately 15 percent by weight.

The caged balls travel on an inner race 16 and an outer race 18. The balls 20 are preferably a stainless steel such as the type known 440C. The races are comprised of a metal having suitable strength and hardness such as, for example, type 52100 alloy steel. Both races are plated, in the manner well known in the art, with a soft metal 22 which exhibits substantive affinity to sulphur. The preferred plating material is silver deposited on the groove or raceway surface 24 of each race in a thickness of from $25 \times 10^{-6}$ inches to $250 \times 10^{-6}$ inches.

In a preferred embodiment of the invention which has been successfully tested, the retainer 14 was molded polytetrafluoroethylene which included approximately 15 percent microfiberglass, by weight, and approximately 15 percent molybdenum disulfide, by weight. The balls 20 were 440C stainless steel, and the races 16 and 18 were 52100 alloy steel plated with a 0.0001 inch layer of silver. This preferred configuration was incorporated into a standard AFBMA 20 m.m. bore, 42 m.m. O.D., 12 m.m. wide ball bearing (Anti-Friction Bearing Manufacturers Assoc.), also known as a No. 104 bearing, and several such bearings were installed for test in an environment requiring dry film lubricant bearings. These test bearings replaced bearings of different configuration which had an average useful life of 6 to 8 weeks. The bearings constructed in accordance with the present invention had a reported increase of from 50 to 100 percent in useful life over those which they replaced, the bearings of the present invention having an average useful life of up to 13 to 16 weeks.

While not wishing or intending to be bound by any particular mechanism or theory of operation, it appears that the present invention involves a combination of factors relating to the silver races, the stainless steel balls and the metallic sulfide retainer. During the break-in period the soft metal on the races, i.e., the silver, reduces wear of the bearing, and may also act as a dry lubricant. Silver is essentially insoluble in stainless steel, and therefore there is no galling between the balls and races. During continued operation the balls pick up $MoS_2$ from the races and become coated therewith. Silver has a high affinity for sulphur, and the $MoS_2$ appears to bond to the silver in the races, in what may be a chemisorption process although not necessarily forming silver sulfide. The bonding of the $MoS_2$ to the races results in the formation of a coating of $MoS_2$ on the races, and then the contact is a low friction and low wear between the $MoS_2$ coating on the balls and the $MoS_2$ on the races.

It is important to note that the soft material initially coated on the races, e.g. the silver, is insoluble with the hard material of the balls and has a bonding affinity for the metallic sulfide with which the polymeric race is filled. Combinations of materials which exhibit these mutual qualities may be used within the scope of this invention rather than the specific materials discussed herein.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A bearing assembly including:
   an inner race element having a raceway therein;
   an outer race element having a raceway therein;
   a coating of metal on the raceway of each of said inner and outer race elements, said coating being of a material softer than the material of said raceways;
   a plurality of bearing elements between said race elements, said bearing elements being of a material insoluble with said metal coated on said races; and
   retainer means for retaining said bearing elements, said retainer means being composed of a polymeric material filled with a metallic sulfide which has an affinity for said metal coated on said races.

2. A bearing assembly as in claim 1 wherein:
   said coating of metal on said raceways is of a thickness from $25 \times 10^{-6}$ inches to $25 \times 10^{-6}$ inches.

3. A bearing assembly as in claim 1 wherein:
   said metallic sulfide comprises from 2 to 5 percent, by weight of said retainer means.

4. A bearing assembly including:
   an inner race element having a raceway therein;
   an outer race element having a raceway therein;
   a coating of silver on each of said raceways, said silver coating being softer than the material of the raceways on which it is coated;
   a plurality of bearing elements between said race elements, said bearing elements being of a material insoluble with silver; and
   retainer means for retaining said bearing elements, said retainer means being composed of a polymeric material filled with a metallic sulfide which has an affinity for silver.

5. A bearing assembly as in claim 4 wherein:
   said bearing elements are stainless steel and said race elements are a steel alloy.

6. A bearing assembly as in claim 4 wherein:
   said silver coating is from $25 \times 10^{-6}$ inches to $250 \times 10^{-6}$ inches.

7. A bearing assembly as in claim 6 wherein:
   said silver coating is approximately 0.0001 inches thick.

8. A bearing assembly as in claim 4 wherein:
   said metallic sulfide comprises from 2 to 50 percent by weight of said retainer means.

9. A bearing assembly as in claim 8 wherein said metallic sulfide is molybdenum disulfide.

10. A bearing assembly as in claim 9 wherein:
    said molybdenum sulfide comprises approximately 15 percent by weight of said retainer means.

* * * * *

PO-1050
(5/69)

UNITED STATES PATENT OFFICE
CERTIFICATE OF CORRECTION

Patent No. 3,843,962        Dated October 22, 1974

Inventor(s) Irving R. Bogue

It is certified that error appears in the above-identified patent and that said Letters Patent are hereby corrected as shown below:

Column 4, line 7, (claim 2, line 3) change "25" (second occurence) to --250--

Signed and sealed this 17th day of December 1974.

(SEAL)
Attest:

McCOY M. GIBSON JR.        C. MARSHALL DANN
Attesting Officer        Commissioner of Patents